Aug. 19, 1947.  R. LUCIEN  2,425,948
POWERED VEHICLE OF CONNECTED SECTIONS
Filed May 11, 1944  3 Sheets-Sheet 2
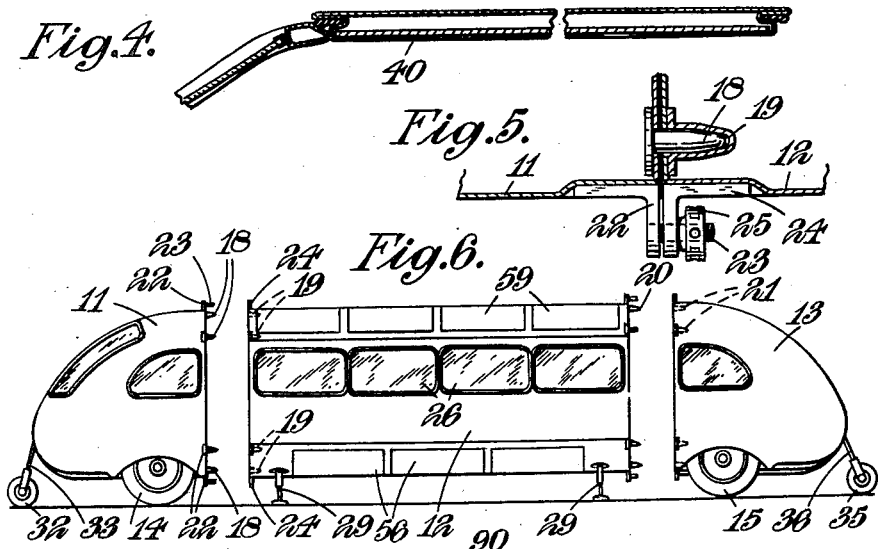
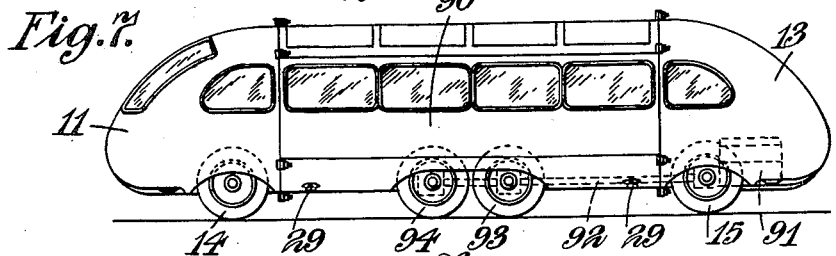
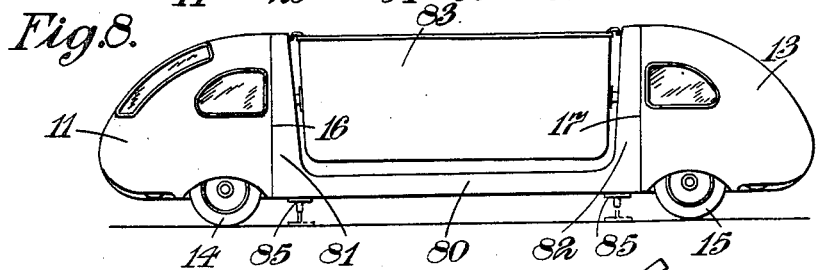
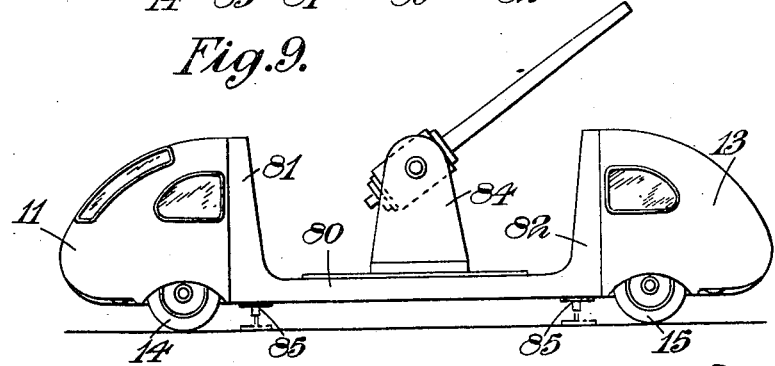
Inventor
Rene Lucien

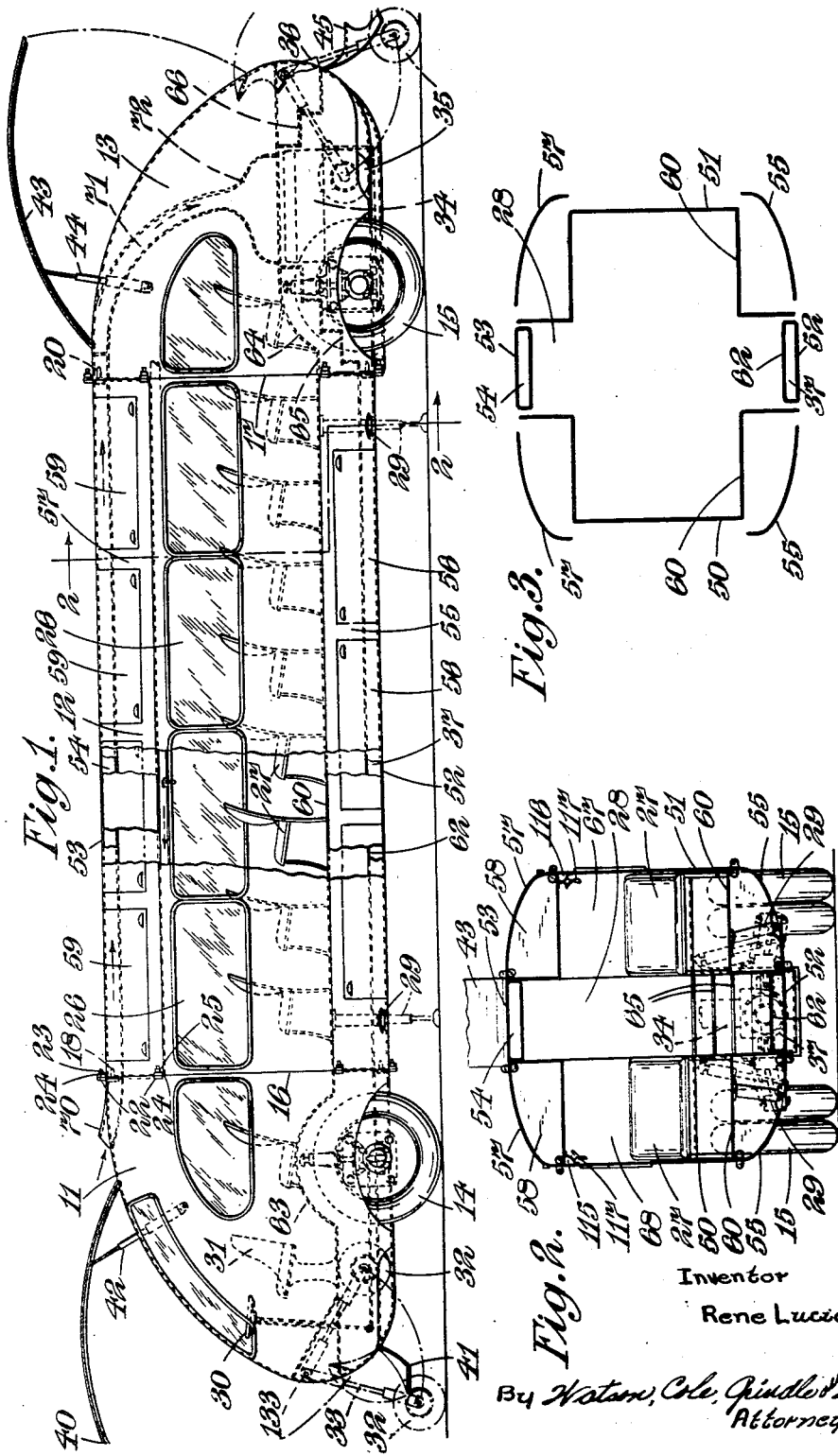

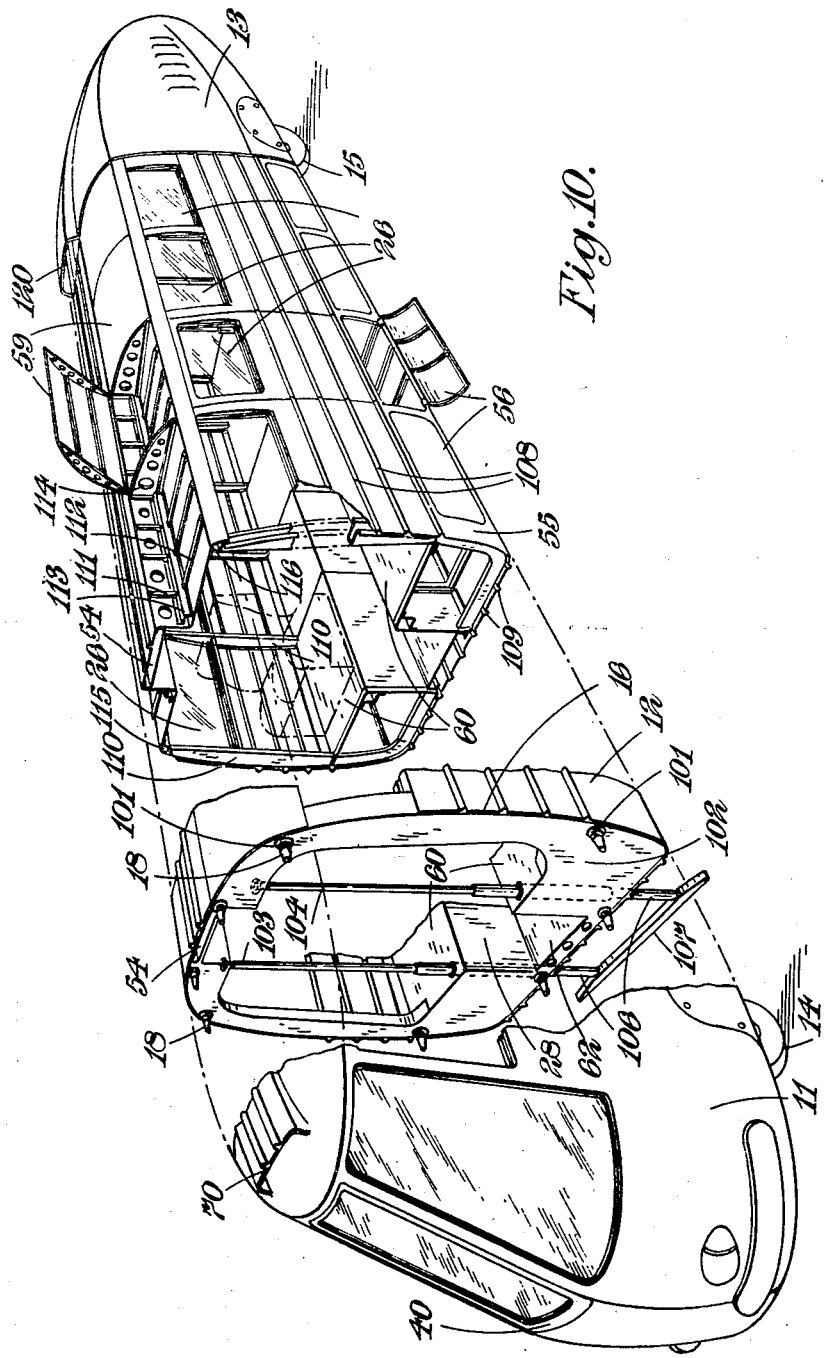

Patented Aug. 19, 1947

2,425,948

UNITED STATES PATENT OFFICE 2,425,948

POWERED VEHICLE OF CONNECTED SECTIONS

René Lucien, Farnham Common, England

Application May 11, 1944, Serial No. 535,127
In Great Britain March 15, 1943

4 Claims. (Cl. 180—11)

1

This invention comprises improvements in or relating to vehicles, and has for its purpose to provide a construction whereby greater economy in the utilisation of transport can be achieved, repairs are facilitated and vehicles can readily be adapted for varying requirements.

According to this invention a vehicle comprises a front section containing the controls, a central section to carry the load and a rear supporting section, the sections being provided with means for readily securing them together and detaching them from one another so that similar sections may be easily interchanged.

In the preferred construction the front and rear sections are wheeled and the central section is supported at its ends on the front and rear sections.

The central section may constitute the sole connecting means between the front and rear sections the divisions between the connections being made by butting faces which are vertical or nearly so.

Preferably the propulsive means are located in the rear section.

The central section is normally entirely supported by the front and rear sections but in case of transporting very heavy weights additional wheels or endless track supports may be provided on the central section also.

It will be appreciated that in a complete system of transport a number of different types of central section would be provided, some for passenger transport, some for goods transport and some for special loads of various kinds and that all these types of central section could be readily fitted between the end sections. Moreover the end sections may also be of diverse types; for instance one type of rear section may be specially adapted for propelling the vehicle through hilly or broken country and another type for more rapid transport where the country is flatter; again, town and country transport may call for different types of end sections and central sections may be transferred from one type to another without disturbing goods or passengers carried therein. In case of breakdown it is simple to change only the defective portion of the vehicle.

The following is a description, by way of example, of one vehicle constructed in accordance with the invention:

In the accompanying drawings—

Figure 1 is a side elevation of the vehicle with a portion of the centre broken away to show internal construction.

2

Figure 2 is a cross-section upon the line 2—2 of Figure 1.

Figure 3 is an "exploded" diagrammatic section indicating the essential component parts of the body.

Figures 4 and 5 are details.

Figure 6 shows the end and central sections of the body disassembled from each other.

Figure 7 is a side elevation of an alternative construction.

Figure 8 is a side elevation showing the end sections assembled with a different form of central section.

Figure 9 is a similar view of another form.

Figure 10 is a perspective view of a part of the body showing certain alternative features.

The vehicle comprises a front section 11, a central section 12 and a rear section 13. The front and rear sections are provided with wheels 14, 15 and are adapted to fit on the ends of the central sections by joints indicated at 16, 17, Figure 1. The joints comprise locating members 18 on the front section 11 to enter sockets 19 in the central section 12 and locating members 20 on the central section to enter sockets 21 on the rear section 13 (see Figure 6). In addition there are a number of lugs 22 on the front section which carry bolts 23 to enter lugs 24 on the central section, these bolts being capable of being secured by nuts 25, these details being best seen in Figure 5 of the drawing. The connection is such as to be capable of transmitting tensile and compressive stresses at the top and bottom and to render the vehicle rigid as a whole. If the projection of the lugs 22, 24 is objected to, an alternative construction is shown in Figure 10 of the drawing in which the screw means for uniting the sections of the body are incorporated in the locating bolts, as hereinafter more fully described. In Figure 1, the central section is shown as a passenger-carrying section having side windows 26, upholstered seats 27 and a central passage 28 (Figure 2) from end to end. This section is provided with supporting jacks 29 at the four lower corners so that it can be temporarily supported from the ground at an appropriate height when disconnected from the end sections, as shown in Figure 6. The central section 12 will normally be parallel-sided and of the same height from end to end.

The wheels 14 of the front section are steerably mounted upon their axle and are connected to a steering wheel 30. The driver's seat 31 is located in this section. The front section 11 is curved so as to have a more or less streamlined nose and its sides are shaped to conform with the shape of the section 12 at the joint 16. In addition to the normal running wheels 14 a pair of castor wheels 32 are provided mounted on extensible struts 33 pivoted at 133. The struts 33 are constructed similarly to the shock absorbers of aircraft undercarriages and are provided with retracting means for retracting them into the section 11 or letting them down to the ground into the position shown in chain lines in Figure 1 and in full lines in Figure 6. The details of the struts and of the retraction mechanism may be similar to that adopted on aircraft and do not require to be described in connection with the present invention. The castor wheels 32 can be let down into contact with the ground to support the nose end of the section 11 when it is detached from the section 11 and to permit the section to be wheeled about in the detached condition.

The rear section 13 is similar in general shape to the front section but instead of containing steering mechanism it is provided with an engine (34 shown in dotted lines in Figure 1) connected through a gear box and differential to the rear driving wheels 15. The details of this arrangement may be, so far as the gear box and differential are concerned, constructed in accordance with ordinary automobile practice and the connection to the rear driving wheels is described in more detail in co-pending United States Patent Application Serial No. 535,128, filed May 11, 1944, which also describes the steering connections of the front wheels 14.

The rear section 13 also has a pair of castor wheels 35 mounted on shock absorber struts 36 similarly to the wheels 32 and struts 33 of the front section 11 and as before the wheels can be retracted into the section when desired. Engine and gear box controls are provided which can be coupled to connecting means passing through the central section 12 in a hollow space 37 in the floor of the central passageway 28 and thence to control devices at the driver's seat 31. Similarly brake control connections extend from the rear wheels 15 through the central section to a brake pedal in the section 11 by the driver's seat. The engine control and brake control connections are made readily detachable at the joints 16, 17. For the purpose of these connections any known form of remote control mechanism can be adopted, either by connecting rods which can be united together by removable pins or right- and left-handed screw-threaded connections or by electrical control wires or by hydraulic pipe connections such for example, as might be employed in a hydraulic distant control.

When the sections 11, 12 and 13 have been coupled together and the castor wheels 32, 35 have been retracted and the jacks 29 which support the central section 12 lifted clear of the ground, the vehicle is capable of travelling like an ordinary passenger coach, as may be desired. A metal door 40 (shown in section, Figure 4) for access to the interior is provided in the front of the section 11 in line with the central passage 28. The door 40 co-operates with a hinged step portion 41 and is shaped to conform with the rounded nose of the section 11. Preferably it is capable of being opened by a hydraulic jack 42 under the control of the driver.

The section 13 is provided with a somewhat similar curved door 43 capable of being opened by a hydraulic jack 44 and co-operating with a hinged step portion 45. Thus a passenger may enter at the front and leave at the back of the vehicle.

The body of the vehicle 12 is built up, as can be seen from Figure 3 of the drawing, from sheet metal sections which are constituted by side members 50, 51 united by an intermediate flat tubular member 52 at the bottom and a similar member 53 at the top. When united together these sections afford a rigid tubular body of which the member 52 provides the floor 62 with the hollow space 37 for the control connections enclosed within it. The member 53 constitutes the roof of the central corridor 28 and has an air duct 54 enclosed within it. The outline of the body is completed by curved sections 55 at the bottom which fill out the corners and afford storage space for luggage which is closed in by doors 56 (Figure 1). Similarly at the top there are curved roof sections 57 which enclose luggage space 58 to which access may be gained by hinged doors 59. The seats 27 rest on platforms 60 formed from the side members 51 of the tubular body, these platforms being at a higher level than the floor 62 provided by the upper part of the tubular bottom section 52.

The ends of the body section 12 are stiffened by transverse partitions 67, 68 so that only the central passage 28 extends right through the vehicle.

As can be seen from Figure 1 the end sections 11 and 13 contain platforms which constitute continuations of the platforms 60 but which are upcurved at 63, 64 so as to rise over the wheels. The platforms 64 in the rear section 13 rise to a height sufficient to cover the engine 34. The nose section 11 has a central floor to its passage which constitutes an extension of the floor 62 at the same level. In the rear section 13 the central passage is provided with steps 65, 66 to enable the floor to rise over the engine 34 and the steps 66 are continuous with the hinged steps 45 when the latter are lowered, as shown in Figure 1.

The air duct 54 through the roof of the central section 12 communicates with an air intake 70 in the front section 11 and it leads to a downwardly curved air passage 71 in the rear section 13. The air passage 71 is deflected laterally so as to avoid obstruction of the central passageway 28 and it delivers air to a cowling 72 which is located in the rear section 13 on the air-intake side of the engine. The air is delivered to the engine and also to the vehicle, the latter through ducts 115, 116 and ventilators 117.

On the termination of a journey, or of a portion thereof, the end sections 11, 13 can be detached as shown in Figure 6 and they may be either coupled to another central section for the return journey, or they may be withdrawn for servicing, leaving other end sections to be coupled to the central section, or the front and rear sections can be coupled to one another to constitute a short complete vehicle which can return unloaded to its starting point and can bring another central section such as 12, or of a different pattern on a subsequent journey.

Instead of the passenger central section 12 there might be provided a goods section for the transport of goods traffic. Such a section would comprise a platform 80 as shown in Figure 8 or Figure 9 and end brackets 81, 82 which are strong enough and high enough to be coupled rigidly to the end sections 11 and 13 by appropriate connections at the joints 16, 17 as already described. The goods sections will be designed in accordance with the requirements of the traffic which they have to carry. Some may be adapted to receive separate containers mounted upon the flat platform 80. Alternatively the goods sections may have sides to receive bulky goods, such as grain or coal. Again a goods section may be provided with a tipping hopper, such as the hopper 83 shown in Figure 8, or there may be a gun mounting, such as 84 shown in Figure 9. Each of the goods sections has appropriate jack feet 85 to support it when not mounted upon the end sections 11, 13. Any other mechanism such, for example as a crane, may be accommodated in appropriately designed central sections and in this connection it will be observed that a crane or a gun mounted on a central section in accordance with the present invention can be left in situ in readiness for use and the end sections 11, 13 can be joined together and returned for bringing up other cranes or guns, ammunition or the like. If the goods to be transported by the central section be heavy, additional wheels can be provided thereon.

Figure 7 shows a modification in which the end sections 11 and 13 are joined to a central section 90 and the end section 13 is provided with an engine 91 which has a double differential so that not only can it drive the rear wheels 15 but also a transmission shaft 92 which is connected to additional driving wheels 93, 94 mounted on the central section and connected to the shaft 92 through appropriate differential gear. If this arrangement is adopted then when the double differential of the engine 91 is coupled to the shaft 92 the vehicle will automatically divide the drive between the rear and central sections and will proceed in heavily loaded condition with high tractive effort at relatively low speed. The connection to the shaft 92 on the rear section 13 must, of course, include a detachable flange or like coupling. If the end section 13 is disconnected from the section 90 and a blank flange, fixed to the body of the section 13, is substituted for the driven flange of the shaft 92, the part of the differential in the section 13 which drives shaft 92 will be held from rotation, and in this case the wheels on the rear section will be automatically driven with a higher gear ratio. Thus, for lighter traffic, or in flatter country, the section 13 may be connected to a section, such as 12, which has no driving wheels located thereon and the vehicle will have a higher speed. The same will be true if the section 13 is connected to the front section 11 alone and is being driven to its starting point unloaded.

Preferably when the central section 90 is provided with an engine 91 located in the rear section 13, the rear wheels 15 are made steerable as well as being drivable and the steering is divided between the rear and front sections; that is to say, the front wheels 14 are made to turn in one direction and the rear wheels 15 to turn in the opposite direction, as viewed in plan, while leaving the central wheels 93, 94 parallel with the centre line of the body. Means for steering driven wheels are already well known and might in accordance with this invention follow any desired design. The construction of the body and the suspension may be in accordance with that described in co-pending United States patent application Serial No. 535,128, filed May 11, 1944.

Referring to Figure 10, this shows a vehicle which, while slightly modified in shape, is substantially of the same construction as that shown in Figure 1 and similar parts are lettered with similar reference numerals. It will therefore not be necessary to describe the whole of the construction of this vehicle. The parts are shown broken away at several sections to indicate the internal construction and the following special features, most of which are obviously applicable to Figure 1, also are shown in the drawing.

At the joint 16, between the central section and the nose section 11 the conical locating members 18 are mounted so as to enter sockets in the nose section 11 and they are made rotatable. At the root portion of the locating members 18 they are screwthreaded externally as shown at 101 and the sockets in the nose section 11 are similarly screwthreaded. These locating members are mounted in a stiffening plate 102 which forms the front portion of the body section 12 and they have heads on the other side of the plate 102 by which they can be rotated. As a result, when the nose section 11 is positioned against the body section 12, on rotating the locating members 18, the two parts are screwed together and the external finish is flush instead of being marked by a number of lugs and nuts as previously described.

In this instance the supporting jacks for the central section 12 are made in pairs which are hidden in the base portions of standards 103, 104 located one each side of the central passageway 28. The lower movable portion of the supporting jacks is mounted on two rods 106 the lower ends of which are united by a cross-bar 107. The cross-bar is lowered by hydraulic pressure applied to the jacks by appropriate connections when the parts are to be disconnected from one another. A similar arrangement is provided at the other end of the body 12.

In order to stiffen the sides of the vehicle the sheet metal of these parts is longitudinally corrugated as indicated at 108. The metal of the bottom part of the vehicle may also be corrugated as shown at 109. At intervals along the length of the body between the windows 26 there are transverse frame members 110 which serve further to stiffen the construction and the luggage spaces are stiffened by ribs 111, 112, 113, and by brackets 114.

The air entry 70 is used to convey air to a conditioning plant located in the rear section 13 from which the air is redistributed to the interior of the vehicle by the conduits 115, 116 located in the top upper corners of the body above the seats. Similar conduits 115 and 116 are shown in Figure 2 of the drawing and they are provided with regulatable ventilators 117 which are accessible to passengers. In this case the air intake for the engine is constituted by a second inlet 120 at the top of the rear section 13 in such a position that it overlies the conduit 54.

I claim:

1. A passenger-carrying vehicle comprising a front section, a central load carrying section, and a rear section, the front and rear sections being provided with supporting wheels but the central section supported by the other two, quick-detachable means on all of said sections for readily securing the sections together and detaching them from one another, so that similar sections may be easily interchanged, the central section being of tubular self-sustaining structure the side walls of which are uninterrupted by door openings, registering openings in the abutting ends of said central and end sections of the vehicle comprising the sole means of ingress and egress of said central section, a longitudinal passageway or aisle extending through said registering openings and through the front, central, and rear sections, and outer doors at the front of said front section and at the back of said rear section affording access to the vehicle, and a driver's seat in said front section disposed at one side of that portion of the aisle which extends through the front section.

2. A road vehicle system for flexible service comprising, in combination, a steerable front section provided with a driver's seat, a powered rear section, and a plurality of insertable and selectively interchangeable passenger and goods carrying central sections, the front and rear sections being provided with supporting wheels but the selected central section supported in operative position by the other two sections, quick-detachable means on all of said sections for readily securing the sections together and detaching them from one another, said quick-detachable means being standardized both as to structure and relative position, so that the front and rear sections may be secured directly together or secured to the opposite ends of a selected central section, a rigid transversely extending plate member carried by each of the inner ends of the front and rear sections and both ends of the central section, said quick-detachable means comprising complementary connecting elements on said plate members, each occupying the same relative position on its plate member as its mating element occupies on the abutting plate member of the adjacent section.

3. A road vehicle system for flexible service comprising, in combination, a steerable front section, a powered rear section, and a plurality of insertable and selectively interchangeable passenger and goods carrying central sections, the front and rear sections being provided with supporting wheels but the selected central section supported in operative position by the other two sections, quick-detachable means on all of said sections for readily securing the sections together and detaching them from one another, said quick-detachable means being standardized both as to structure and relative position, so that the front and rear sections may be secured directly together or secured to the opposite ends of a selected central section, a rigid transversely extended plate member carried by each of the inner ends of the front and rear sections and both ends of the central section, said quick-detachable means comprising complementary connecting elements on said plate members, each occupying the same relative position on its plate member as its mating element occupies on the abutting plate member of the adjacent section, and a set of vertically adjustable jacks supporting a central section not in use and adapted to accurately position said central section vertically with respect to the end sections so that the mating elements of the quick-detachable means will register horizontally.

4. A road vehicle system for flexible service comprising, in combination, a steerable front section, a powered rear section, and a plurality of insertable and selectively interchangeable passenger and goods carrying central sections, the front and rear sections being provided with supporting wheels but the selected central section supported in operative position by the other two sections, quick-detachable means on all of said sections for readily securing the sections together and detaching them from one another, said quick-detachable means being standardized both as to structure and relative positions, so that the front and rear sections may be secured directly together or secured to the opposite ends of a selected central section, a rigid transversely extended plate member carried by each of the inner ends of the front and rear sections and both ends of the central section, said quick-detachable means comprising complementary connecting elements on said plate members, each occupying the same relative position on its plate member as its mating element occupies on the abutting plate member of the adjacent section, a set of vertically adjustable jacks supporting a central section not in use and adapted to accurately position said central section vertically with respect to the end sections so that the mating elements of the quick-detachable means will register horizontally, and retractable temporary supporting wheels carried by said front and rear sections for use in transporting said latter sections when separated from the assembly.

RENÉ LUCIEN.

REFERENCES CITED

The following references are of record in the file of this patent:

UNITED STATES PATENTS

| Number | Name | Date |
|---|---|---|
| 2,128,930 | Fageol et al. | Sept. 6, 1938 |
| 1,804,046 | Abbe | May 5, 1931 |
| 2,141,267 | Dillon | Dec. 27, 1938 |
| 1,806,523 | Vizcaya | May 19, 1931 |
| 877,750 | Windham | Jan. 28, 1908 |
| 2,097,113 | Bradley | Oct. 26, 1937 |
| 1,855,642 | Masury | Apr. 26, 1932 |
| 2,319,002 | Kramer | May 11, 1943 |
| 1,650,203 | Froesch | Nov. 22, 1927 |
| 1,953,515 | Smith | Apr. 3, 1934 |
| 1,989,995 | Martin | Feb. 5, 1935 |
| 2,352,929 | Worgess | July 4, 1944 |
| 827,899 | Zimmerman | Aug. 7, 1906 |

FOREIGN PATENTS

| Number | Country | Date |
|---|---|---|
| 491,383 | Great Britain | Sept. 1, 1938 |
| 91,754 | Switzerland | Nov. 16, 1921 |
| 476,100 | Great Britain | Dec. 1, 1937 |